(12) United States Patent
Correns et al.

(10) Patent No.: US 7,082,003 B2
(45) Date of Patent: Jul. 25, 2006

(54) PRESSURE COMPENSATING DEVICE FOR OPTICAL APPARATUS

(75) Inventors: Nico Correns, Weimar (DE); Ullrich Klarner, Jena (DE); Werner Hoyme, Gebstedt (DE); Felix Kerstan, Jena (DE)

(73) Assignee: Car Zeiss Jena GmbH, Jena (DE)

( * ) Notice: Subject to any disclaimer, the term of this patent is extended or adjusted under 35 U.S.C. 154(b) by 61 days.

(21) Appl. No.: 10/415,213

(22) PCT Filed: Mar. 19, 2002

(86) PCT No.: PCT/EP02/02991

§ 371 (c)(1),
(2), (4) Date: Apr. 24, 2003

(87) PCT Pub. No.: WO02/082153

PCT Pub. Date: Oct. 17, 2002

(65) Prior Publication Data

US 2004/0027565 A1 Feb. 12, 2004

(30) Foreign Application Priority Data

Apr. 6, 2001 (DE) .............................. 101 17 170

(51) Int. Cl.
*G02B 7/02* (2006.01)
*H01J 3/14* (2006.01)

(52) U.S. Cl. ................. 359/819; 359/811; 250/216

(58) Field of Classification Search ............... 359/813, 359/819, 820, 290, 291, 811, 824, 214, 295, 359/224, 298; 356/302
See application file for complete search history.

(56) References Cited

U.S. PATENT DOCUMENTS 3,498,695 A 3/1970 Bronwer
3,759,605 A * 9/1973 Johnson ...................... 359/667
4,402,574 A * 9/1983 McConnel .................. 359/667
4,419,663 A * 12/1983 Kohashi ...................... 345/107
4,616,908 A 10/1986 King
4,676,631 A * 6/1987 Kosugi et al. ................. 355/55
4,763,145 A * 8/1988 Takamura et al. ............. 396/26
4,871,237 A * 10/1989 Anzai et al. ................ 359/666
5,170,283 A * 12/1992 O'Brien et al. ............. 359/291
5,212,595 A * 5/1993 Dennison et al. ........... 359/513
5,337,097 A * 8/1994 Suzuki et al. ............... 353/101
5,751,469 A * 5/1998 Arney et al. ................ 359/291

(Continued)

FOREIGN PATENT DOCUMENTS

DE 19 64 496 7/1971

(Continued)

Primary Examiner—Loha Ben
(74) Attorney, Agent, or Firm—Reed Smith LLP

(57) ABSTRACT

In order to provide an arrangement for pressure compensation for optical devices, particularly spectrometers or the like optical devices, for compensating pressure differences caused by changes in temperature and air pressure between the internal pressure and the external pressure at a housing of an optical device enclosing optical units, which arrangement prevents a contamination of optical functional surfaces of the optical units of the optical device and ensures a constant pressure balance between the interior space and the external surroundings of the housing of an optical device with its optical units while economizing on manufacturing costs, it is proposed that the arrangement for pressure compensation comprises at least one pressure compensating element which is constructed on both sides so as to be permeable to air and which is arranged in a housing opening of the housing wall of the optical device enclosing the optical units.

12 Claims, 2 Drawing Sheets

U.S. PATENT DOCUMENTS

| | | | | |
|---|---|---|---|---|
| 5,786,927 A | * | 7/1998 | Greywall | 359/291 |
| 5,808,781 A | * | 9/1998 | Arney et al. | 359/291 |
| 6,224,248 B1 | * | 5/2001 | Chiba | 362/580 |
| 6,226,133 B1 | * | 5/2001 | Osakabe | 359/811 |
| 6,351,329 B1 | * | 2/2002 | Greywall | 359/290 |
| 6,583,850 B1 | * | 6/2003 | Hummel et al. | 355/30 |
| 6,716,161 B1 | * | 4/2004 | Higuma et al. | 600/133 |
| 6,812,451 B1 | * | 11/2004 | Bluemcke et al. | 250/221 |
| 2002/0177052 A1 | * | 11/2002 | Sogard | 430/9 |

FOREIGN PATENT DOCUMENTS

| | | | |
|---|---|---|---|
| DE | 34 43 856 | | 6/1985 |
| DE | 198 50 561 | | 5/2000 |
| DE | 198 59 272 | | 6/2000 |
| DE | 199 40 235 | | 9/2000 |
| JP | 61168919 A | * | 7/1986 |
| JP | 04020185 A | * | 1/1992 |
| JP | 2002005737 A | * | 1/2002 |

* cited by examiner

PRESSURE COMPENSATING DEVICE FOR OPTICAL APPARATUS

CROSS REFERENCE TO RELATED APPLICATIONS

This application claims priority of PCT Application Serial No. PCT/EP02/02991, filed Mar. 19, 2002 and German Application No. 101 17 170.6, filed Apr. 6, 2001, the complete disclosures of which are hereby incorporated by reference.

BACKGROUND OF THE INVENTION a) Field of the Invention

The invention is directed to an arrangement for pressure compensation for optical devices, particularly spectrometers or the like optical devices, for compensating pressure differences caused by changes in temperature and air pressure between the internal pressure and the external pressure at a housing of an optical device enclosing optical units.

b) Description of the Related Art

In general, there is a risk of impairing the performance of the optical units with their functional surfaces in that these surfaces can be contaminated by solid or liquid particles of substances in air through contact of the optical functional surfaces with normal air, which can lead to an impairment or total failure of the operation of the optical units of an optical device. However, when a transfer of air to the optically active functional surface is required for optical reasons, these optical units are installed with their functional surfaces in the housing of the optical device in a sealed manner. On the one hand, this prevents soiling of the optical functional surfaces, but on the other hand the disadvantage of this procedure consists in that pressure differences between the internal pressure and the surrounding pressure of the housing can occur due to changes in temperature and air pressure, so that the tightness of the housing of the optical device is highly stressed.

Therefore, there are strict requirements for the sealing elements of a housing of an optical device with optical units contained therein. On the one hand, absolutely tight housings are difficult to achieve and, on the other side, these strict requirements for the sealing elements of the housing result in increased technical and monetary expenditure on manufacturing.

Devices for pressure compensation are known from the prior art for other technical areas. For example, DE 198 50 561 A1 shows a device for pressure compensation in a hydraulic system, particularly for a clutch or a brake in a motor vehicle. In this device, a volume compensating element which communicates with the pressure compensating space and which increases its volume by a predetermined extent when there is a vacuum in the pressure space is provided in an embodiment form as a flexible diaphragm.

Further, a gear unit, particularly a planetary gear unit, is known from DE 199 40 235 C1, in which the pressure balance between the interior of the gear unit housing and the outer surroundings is carried out while simultaneously preventing the escape of impurities in that a deformable diaphragm arranged in the pressure compensating chamber is provided for the interior of the shaft or a gear unit part connected to this shaft, which diaphragm divides the external surroundings from the interior of the gear unit.

DE 198 59 272 A1 discloses another form of a device for pressure compensation in which an interior space in a container being transported is closed by means of a pressure compensating insert which is fixedly connected to a protective foil liner for pressure compensation in this interior space. A pressure potential occurring in the protective foil liner is conducted to the pressure compensation device of the transport container by a diaphragm valve which is integrated in the cover of the pressure compensating insert. In these technical solutions, the diaphragm performs the function of a volume compensating element.

OBJECT AND SUMMARY OF THE INVENTION

Proceeding from the prior art described above, the invention has, as a primary object, provided an arrangement for pressure compensation for optical devices which prevents contamination of optical function surfaces of the optical units of the device while economizing on manufacturing costs and ensures a constant pressure balance between the interior space and the external surroundings of the housing of an optical device with its optical units.

In order to meet this object, an arrangement for pressure compensation is proposed which comprises at least one pressure compensating element which is constructed on both sides so as to be permeable to air and which is arranged in a housing opening of the housing wall of the optical device enclosing the optical units.

It is advantageously provided that the pressure compensating element is constructed as a finely porous flexible diaphragm foil which is permeable to air on both sides.

Due to the fact that the pressure compensating element is provided in particular as a diaphragm foil arranged in a housing opening of the housing wall enclosing the optical units and is constructed so as to be permeable to air and finely porous on both sides, a constant gas exchange can be carried out and, therefore, a constant pressure balance can be carried out between the internal pressure and the surrounding pressure of the housing of the optical device in that air and water vapor can pass through the pressure compensating element and liquid and solid particles are retained. Further, this arrangement for pressure compensation reduces the mechanical loading of the housing of the optical device and, at the same time, lowers the requirements for tightness of the housing because dust and moisture in the form of wetness can not penetrate into the housing.

A preferred variant of an embodiment form of the pressure compensating element consists in that the pressure compensating element comprises a finely porous paper-like material.

A preferred further development consists in that the paper-like material is dyed black or dark in order to exclude the influence of extraneous light on the optical units.

It is advantageous that the pressure compensating element is fastened in a cutout of the housing opening by means of a glue connection.

Another advantageous construction consists in that the housing wall of the optical device has a plurality of housing openings for receiving pressure compensating elements in order to increase the constant pressure compensation for the functional surfaces of the individual optical units, so that during the transfer of air to the optically active functional surfaces contamination of these active functional surfaces is prevented. The quantity of housing openings for receiving pressure compensating elements depends upon the construction of the optical device, i.e., upon the quantity of optical units located therein in the various individual interior spaces of the optical device.

It can also be provided in a variant that when different interior spaces are present in the optical device these interior spaces have additional connection openings for pressure compensation in order to prevent a vacuum from forming in the individual interior spaces of the optical device.

These connection openings are constructed in particular as bore holes.

Another advantageous variant consists in that pressure compensating elements can be inserted into the connection openings between the different interior spaces of the optical device.

A preferred embodiment form consists in that the pressure compensating element is arranged at a predetermined distance from the optical functional surfaces of the optical units, preferably in a housing opening in the housing bottom of the optical device in order to protect the pressure compensating element from damage when working with the optical device.

An advantageous variant consists in that the pressure compensating element is provided in a housing opening in the side wall of the housing of the optical device. This arrangement of a pressure compensating element in the opening of a side wall of the housing has the advantage that dust particles in the surrounding air can not deposit directly on the pressure compensating element.

An embodiment example of the invention is shown in the drawing and described more fully in the following.

DESCRIPTION OF THE PREFERRED EMBODIMENTS

The present invention provides an arrangement for pressure compensation for optical devices for compensating pressure differences caused by changes in temperatures and air pressure between the internal pressure and the external pressure at a housing of an optical device enclosing optical units. The arrangement prevents a contamination of optical functional surfaces of the optical units of the optical device and ensures a constant pressure balance between the interior space and the external surroundings of the housing of an optical device with its optical units while reducing the manufacturing costs.

Figure 1:
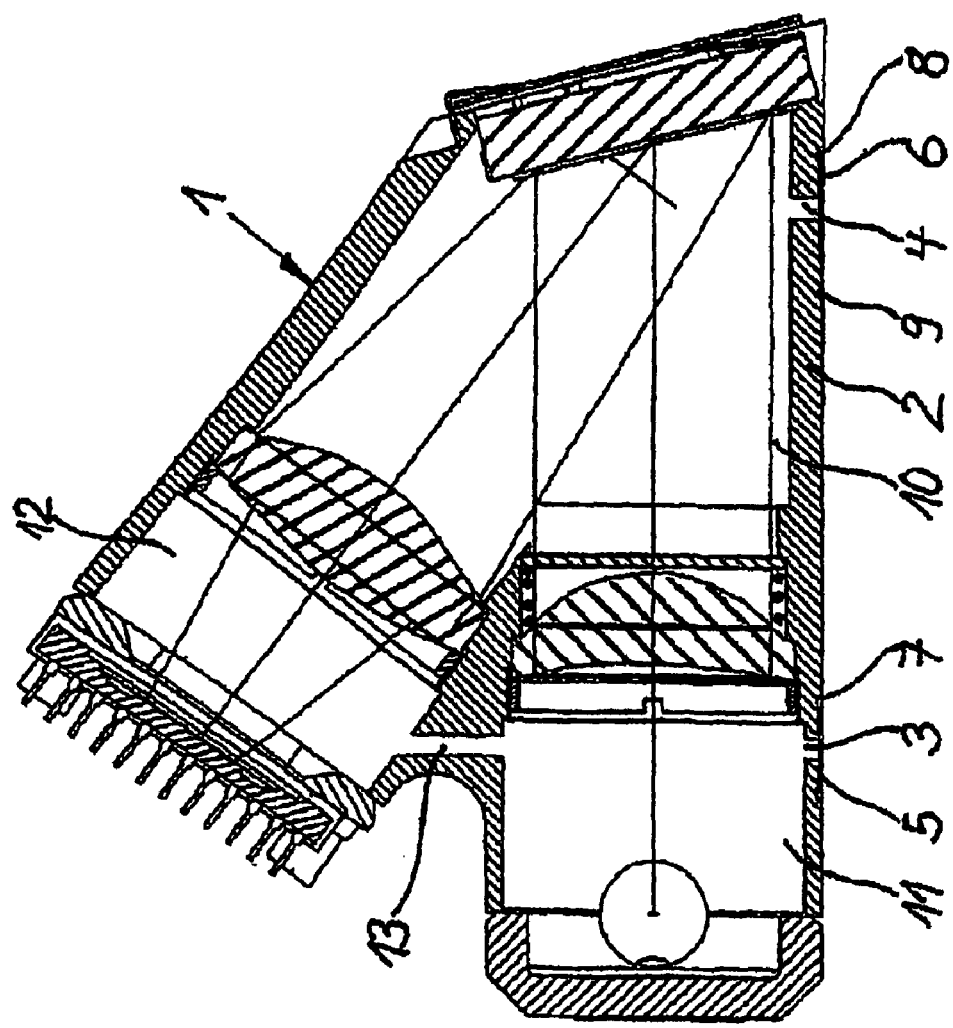
FIG. 1 shows an arrangement of pressure compensating elements in an optical device.

FIG. 1 shows a section of an optical device 1, e.g., of a spectrometer, in which preferably two housing openings 3 and 4 are provided in its housing wall 2, each for receiving a pressure compensating element 5 and 6 in the form of a preferably flexible diaphragm foil which is permeable to air on both sides and which prevents dust and moisture from penetrating into the interior of the optical device 1 and from depositing on the optical functional surfaces of the optical units, but which allows an exchange of gases.

Figure 2:
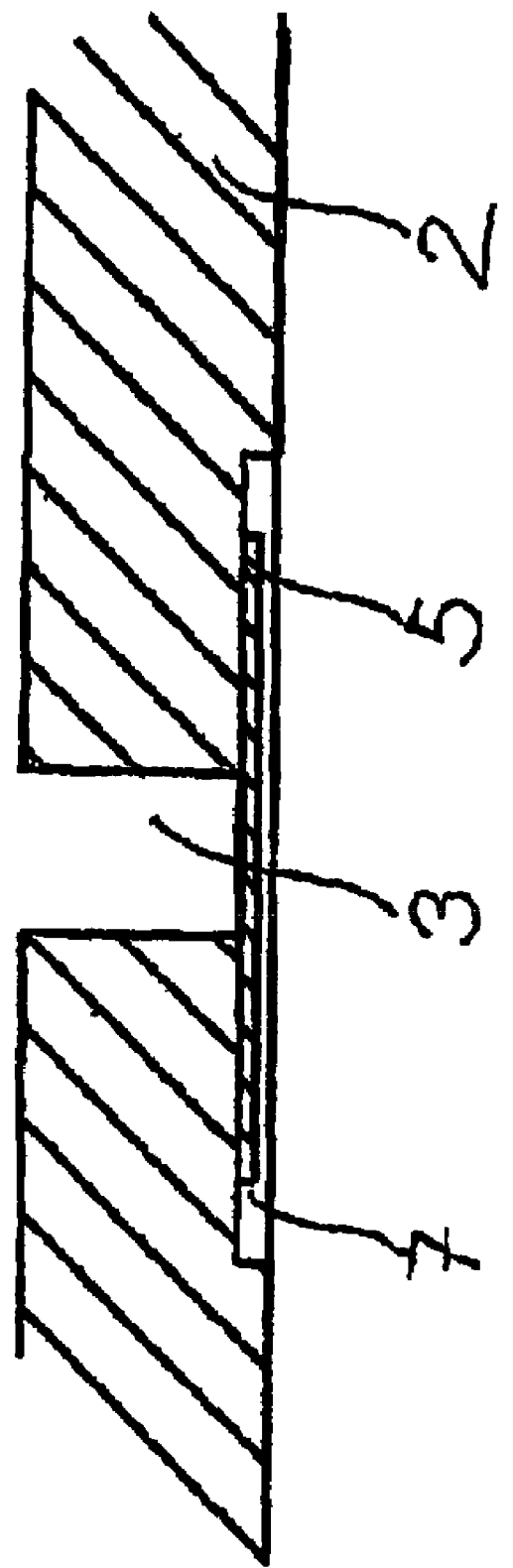
FIG. 2 shows a detailed view of a pressure compensating element in a housing wall.

The diaphragm foil is finely porous for efficient gas exchange. It can comprise paper-like material and is dyed black or dark in order to prevent extraneous light from falling on the optical functional surfaces of the optical units. The size of the pressure compensating elements 5 and 6 depends upon the volume to be closed off by the diaphragm foil, upon the rapidity of the change in pressure and upon the changes in internal and external temperature. The pressure compensating elements 5 and 6 (see FIG. 2) are each arranged in a cutout 7 and 8 of the housing openings 3 and 4 of the housing wall 2 of the optical device 1. The housing openings 3 and 4 are preferably arranged in the housing bottom 9 so that normal functionality of the optical device 1 is ensured and so that additional dust can not deposit directly in the housing openings 3 and 4 and, further, so that these housing openings 3 and 4 are protected against damage. An additional requirement consists in that the housing openings 3 and 4 are arranged as far away as possible from the optical functional surfaces. Another advantageous variant of the arrangement of the pressure compensating elements 5 and 6 in the housing wall 2 consists in that the housing openings 3 and 4 are provided laterally in the housing wall 2.

The pressure compensating elements 5 and 6 are preferably fastened in the cutouts 7 and 8 provided in the housing openings 3 and 4 of the housing wall 2 by a glue connection.

In order to ensure a pressure balance in the different interior spaces 10, 11, 12 of the optical device 1, a connection opening 13 is provided which can be constructed as a bore hole and enables a connection to the different interior spaces 10, 11, 12, so that the pressure in the individual interior spaces 10, 11, 12 is balanced. Instead of a connection opening 13, a plurality of connection openings can also be provided between the different interior spaces 10, 11, 12 and, alternatively, pressure compensating elements 5 can also be inserted into these connection openings.

The invention is not limited to the embodiment example, but can be varied in many ways within the framework of the disclosure.

All new individual features and combination features disclosed in the specification and/or in the drawings are considered substantial to the invention While the foregoing description and drawings represent the present invention, it will be obvious to those skilled in the art that various changes may be made therein without departing from the true spirit and scope of the present invention.

| Reference Numbers: | |
| --- | --- |
| 1 | optical device |
| 2 | housing wall |
| 3 | housing opening |
| 4 | housing opening |
| 5 | pressure compensating element |
| 6 | pressure compensating element |
| 7 | cutout |
| 8 | cutout |
| 9 | housing bottom |
| 10 | interior space |
| 11 | interior space |
| 12 | interior space |
| 13 | connection opening |

The invention claimed is:

1. An arrangement for pressure compensation for optical devices for compensating pressure differences caused by changes in temperature and air pressure between the internal pressure and the external pressure at a housing having a housing wall of an optical device enclosing optical units, comprising:

at least one pressure compensating element which is constructed so as to be permeable to air on both sides of the housing wall and which is arranged in a housing opening of the housing wall of the optical device enclosing the optical units and is provided for pressure compensation.

2. The arrangement according to claim 1, wherein the pressure compensating element is constructed as a finely porous flexible diaphragm foil which is permeable to air on both sides.

3. The arrangement according to claim 1, wherein the pressure compensating element comprises a finely porous material having paper-type characteristics.

4. The arrangement according to claim 3, wherein the finely porous material is dyed black or dark.

5. The arrangement according to claim 1, wherein the pressure compensating element is fastened in a cutout of the housing opening by a glue connection.

6. The arrangement according to claim 1, wherein the pressure compensating element is arranged at a predetermined distance from optical functional surfaces of the optical units.

7. The arrangement according to claim 1, wherein the pressure compensating element is provided in a housing opening in the side wall of the housing of the optical device.

8. An arrangement for pressure compensation for optical devices for compensating pressure differences caused by changes in temperature and air pressure between the internal pressure and the external pressure at a housing having a housing wall of an optical device enclosing optical units, comprising:
   at least one pressure compensating element which is constructed so as to be permeable to air on both sides of the housing wall and which is arranged in a housing opening of the housing wall of the optical device enclosing the optical units and is provided for pressure compensation,
   wherein the housing wall of the optical device has a plurality of housing openings for receiving pressure compensating elements.

9. An arrangement for pressure compensation for optical devices for compensating pressure differences caused by changes in temperature and air pressure between the internal pressure and the external pressure at a housing having a housing wall of an optical device enclosing optical units, comprising:
   at least one pressure compensating element which is constructed so as to be permeable to air on both sides of the housing wall and which is arranged in a housing opening of the housing wall of the optical device enclosing the optical units and is provided for pressure compensation
   wherein different interior spaces in the optical device have connection openings for pressure compensation.

10. The arrangement according to claim 9, wherein pressure compensating elements can be inserted into the connection openings between the different interior spaces.

11. An arrangement for pressure compensation for optical devices for compensating pressure differences caused by changes in temperature and air pressure between the internal pressure and the external pressure at a housing having a housing wall of an optical device enclosing optical units, comprising:
   at least one pressure compensating element which is constructed so as to be permeable to air on both sides of the housing wall and which is arranged in a housing opening of the housing wall of the optical device enclosing the optical units and is provided for pressure compensation
   wherein different interior spaces in the optical device have connection openings for pressure compensation and the connection openings are constructed as bore holes.

12. A pressure compensated device housing an optical unit comprising:
   an optical device housing having a housing wall and an opening in the housing wall;
   an optical unit housed in the optical device housing; and
   a pressure compensating element being permeable to air on both sides and arranged in the opening of the housing wall, the pressure compensating element equalizing a pressure difference caused by changes in temperature and air pressure between the inside and outside of the optical device housing.

* * * * *